(12) United States Patent
Zhao

(10) Patent No.: US 10,706,108 B2
(45) Date of Patent: Jul. 7, 2020

(54) FIELD NAME RECOMMENDATION

(71) Applicant: AppDynamics LLC, San Francisco, CA (US)

(72) Inventor: Yuchen Zhao, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 15/582,661

(22) Filed: Apr. 29, 2017

(65) Prior Publication Data

US 2018/0314765 A1 Nov. 1, 2018

(51) Int. Cl.
| | |
|---|---|
| G06F 17/30 | (2006.01) |
| G06F 16/9032 | (2019.01) |
| G06F 16/248 | (2019.01) |
| G06F 16/242 | (2019.01) |
| G06F 16/2457 | (2019.01) |

(52) U.S. Cl.
CPC ...... *G06F 16/90328* (2019.01); *G06F 16/248* (2019.01); *G06F 16/2428* (2019.01); *G06F 16/2457* (2019.01)

(58) Field of Classification Search
CPC ............. G06F 16/90332; G06F 16/951; G06F 16/248; G06F 16/9535; G06F 16/9032; G06F 16/3322
See application file for complete search history.

(56) References Cited

U.S. PATENT DOCUMENTS

| | | | | |
|---|---|---|---|---|
| 7,343,551 B1* | 3/2008 | Bourdev | ............... | G06F 40/174 715/224 |
| 7,479,949 B2* | 1/2009 | Jobs | ...................... | G06F 3/0488 345/173 |
| 8,234,561 B1* | 7/2012 | Bourdev | ............... | G06F 40/174 715/224 |
| 9,424,318 B2* | 8/2016 | Anand | .............. | G06F 16/24578 |
| 9,589,072 B2* | 3/2017 | Ray | .................... | G06F 16/90335 |
| 2008/0122796 A1* | 5/2008 | Jobs | ...................... | G06F 3/0488 345/173 |
| 2011/0238613 A1* | 9/2011 | Shehory | .............. | G06F 11/3664 706/52 |
| 2011/0246469 A1* | 10/2011 | Yarvis | ..................... | G06F 16/29 707/740 |
| 2012/0246000 A1* | 9/2012 | Yarvis | ..................... | G06Q 30/02 705/14.53 |
| 2012/0310928 A1* | 12/2012 | Ray | .................... | G06F 16/90335 707/728 |
| 2014/0327629 A1* | 11/2014 | Jobs | ...................... | G06F 3/0488 345/173 |
| 2015/0278214 A1* | 10/2015 | Anand | ................. | G06F 16/338 707/748 |
| 2015/0278371 A1* | 10/2015 | Anand | .............. | G06F 16/24578 707/723 |
| 2018/0189294 A1* | 7/2018 | Anand | .................. | G06F 16/338 |

* cited by examiner

*Primary Examiner* — Daniel A Kuddus

(74) *Attorney, Agent, or Firm* — Behmke Innovation Group LLC; James M. Behmke; Jonathon P. Western

(57) ABSTRACT

In one aspect, a system for recommending a field name in data is disclosed. The system includes a processor; a memory; and one or more modules stored in the memory and executable by a processor to perform operations. The operations performed include: receive a user selection from choices of data; convert the selected data into a searchable format; receive a user selection of a portion of the selected data; apply heuristics to the portion; and recommend a field name and a field type based on the heuristics applied to the portion.

7 Claims, 13 Drawing Sheets

Add Source Configuration ............................................................................................................ ✕

| General | Field Extraction | Field Management | Agent Mapping |

| Grok | Auto Field Extraction | Manual Field Extraction |

*Click Upload Sample File or use existing samples in the grid to select a representative log message by hovering on any row and selecting it as a definer sample.*

Preview ⓘ  [ Refresh ]   [ Upload Sample File ]   [ All ] [ Matching ] [ Non Matching ]   [🔍           ]   14 of 14 items Select   Message 127.0.0.1 - - [28/Jul/2006:10:22:04 -0300] "GET / HTTP/1.0" 200 2216

[#|2014-02-13T18:09:52.275-0800 | SEVERE | glassfish3.1.2 | com.appdynamics.AGENT|_ThreadID=52;_ThreadName=Thread-6; | Account key doesn't match with current account for the machine id:null[IP:127.0.0.1 , Host:127.0.0.1]; account key =3be1115c-950a-
+ Select as Definer Sample )992; machine account key=|#]  — 102

[#|2014-02-13T18:09:15.003-0800 |INFO | glassfish3.1.2 | com.singularity.ee.controller.beans.agent.db.MetricMemoryDataStore|
_ThreadID=127;_ThreadName=Thread-6; |Verification started for Thu Feb 13 18:02:00 PST 2014|#]

[#|2014-02-13T18:09:15.012-0800 |INFO | glassfish3.1.2 | com.singularity.ee.controller.beans.agent.db.MetricMemoryDataStore|
_ThreadID=127;_ThreadName=Thread-6; |Verification finished. VerifyResult(verifiedCount=975, rowsCount=2748, errorCount=0)|#]

[#|2014-02-13T18:09:25.125-0800 |INFO | glassfish3.1.2 | com.singularity.ee.controller.beans.analytics.AnalyticsProcessorClusterBean|
_ThreadID=133;_ThreadName=Thread-6; |Starting reverse search count reaping|#]

[#|2014-02-13T18:09:25.126-0800 |INFO | glassfish3.1.2 | com.singularity.ee.controller.beans.analytics.AnalyticsProcessorClusterBean|
_ThreadID=133;_ThreadName=Thread-6; |Completed reverse search count reaping|#]

[#|2014-02-13T18:09:35.442.126-0800 | SEVERE | glassfish3.1.2 | com.appdynamics.AGENT.METRICS_REGISTRATION|_ThreadID=
59;_ThreadName=Thread-6; |Account key doesn't match with current account for the machine id:null[IP:127.0.0.1 , Host:127.0.0.1];
account key=3be1115c-950a-11e3-9d0c-0e9ce7afb992; machine account key=|#]

[#|2014-02-13T18:09 35.667-0800 | SEVERE | glassfish3.1.2 | com.singularity.ee.controller.beans.ExceptionHandlingInterceptor
|_ThreadID=126;_ThreadName=Thread-6; |Encountered runtime exception java.lang.NumberFormatException: For input string: "null"

[ Cancel ]   [ < Back ] [ Next > ]   [ Save ]   14 items

Add Source Configuration

General | Field Extraction | Field Management | Agent Mapping

Grok | Auto Field Extraction | Manual Field Extraction

*Select parts of the text in the definer sample to extract fields. Click highlighted values to edit them.*

▼ Definer Sample

[#|2014-02-13T18:09:52.275-0800|SEVERE|glassfish3.1.2|com.appdynamics.AGENT|_ThreadID=52;_ThreadName=Thread-6;|[Account key doesn't match with current account for the machine id:null|IP:127.0.0.1 , Host:127.0.0.1];account key =3be1115c-950a-De9ce7afb992; machine account key=|#]

▼ Regular Expression

^(?(:[^|]*?))|?|2|(?<logLevel>)(?:(Aa)ert|ALERT|(T)trace|TRACE|(D)debug|DEBUG|(nN)OTICE|notice|(I)nfo|INFO|(Ww)arn?(?:>ing)?|Warn?(?:INFO)|(E)err?(?:or)?|ERR?(?:or)?|(Cc)rit?)?:ical) ?|CRIT?(?:ICAL)?|(Ff)atal|FATAL|(Ss)evere|SEVERE|EMERG(?:ENCY)?(?:(Ee)merg(?:ency)?(?:<=)-(2)(?:<ThreadName>\S+):

| Preview | Refresh | Upload Sample File | All | Matching (9) | Non Matching (5) | 🔍 | 14 of 14 items |
|---|---|---|---|---|---|---|---|
| Select | Message | | | | | logLevel | ThreadName |
| ✗ | 127.0.0.1 - - [28/Jul/2006:10:22:04 -0300] "GET HTTP/1.0" 200 2216 | | | | | | |
| ✓ | [#\|2014-02-13T18:09:52.275-0800\|SEVERE\|glassfish3.1.2\|com.appdynamics.AGENT\|_ThreadID=52;_ThreadName=Thread-6;\| Account key doesn't match with current account for the machine id:null\|IP:127.0.0.1 , Host:127.0.0.1]; account key =3be1115c-950a-0e9ce7afb992; machine account key=\|#] | | | | | SEVERE | Thread-6 |
| ✓ | [#\|2014-02-13T18:09:15.003-0800\|INFO\|glassfish3.1.2\|com.singularity.ee.controller.beans.agent.db.MetricMemoryDataStore\| _ThreadID=127;_ThreadName=Thread-6;\|Verification started for Thu Feb 13 18:02:00 PST 2014\|#] | | | | | INFO | Thread-6 |
| ✓ | [#\|2014-02-13T18:09:15.012-0800\|INFO\|glassfish3.1.2\|com.singularity.ee.controller.beans.agent.db.MetricMemoryDataStore\| _ThreadID=127;_ThreadName=Thread-6;\|Verification finished. VerifyResult(verifiedCount=975, rowsCount=2748, errorCount=0)\|#] | | | | | INFO | Thread-6 |
| ✓ | [#\|2014-02-13T18:09:25.125-0800\|INFO\|glassfish3.1.2\|com.singularity.ee.controller.beans.analytics.AnalyticsProcessorClusterBean\| _ThreadID=133;_ThreadName=Thread-6;\|Starting reverse search count reaping\|#] | | | | | INFO | Thread-6 |
| ✓ | [#\|2014-02-13T18:09:25.126-0800\|INFO\|glassfish3.1.2\|com.singularity.ee.controller.beans.analytics.AnalyticsProcessorClusterBean\| _ThreadID=133;_ThreadName=Thread-6;\|Completed reverse search count reaping\|#] | | | | | INFO | Thread-6 |
| ✓ | [#\|2014-02-13T18:35:442.126-0800\|SEVERE\|glassfish3.1.2\|com.appdynamics.AGENT.METRICS_REGISTRATION\|_ThreadID= 59;_ThreadName=Thread-6;\|Account key doesn't match with current account for the machine id:null[IP:127.0.0.1 , Host:127.0.0.1]; account key=3be1115c-950a-11e3-9d0c-0e9ce7afb992; machine account key=\|#] | | | | | SEVERE | Thread-6 |
| ✓ | [#\|2014-02-13T18:09.35.667-0800\|SEVERE\|glassfish3.1.2\|com.singularity.ee.controller.beans.ExceptionHandlingInterceptor _ThreadID=126;_ThreadName=Thread-6;\|Encountered runtime exception | | | | | SEVERE | Thread-6 |

Cancel | < Back | Next > | Save | 14 items.

FIG. 1F

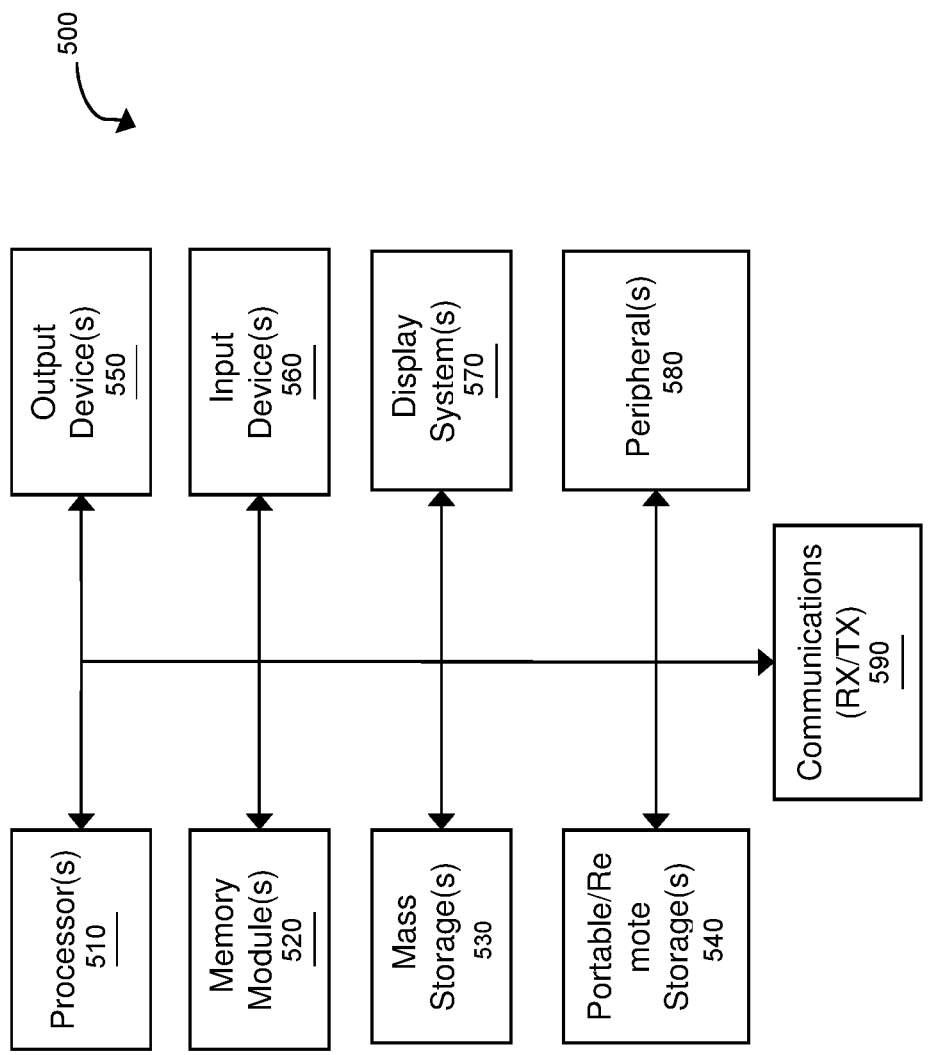

FIELD NAME RECOMMENDATION

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of field name recommendations are disclosed. Specifically, the disclosed technology for field name recommendations can be implemented for field extraction in an unstructured string of data, such as a log message or a business transaction stack trace.

In one aspect, a system for recommending a field name in data is disclosed. The system includes a processor; a memory; and one or more modules stored in the memory and executable by a processor to perform operations. The operations performed include: receive a user selection from choices of data; convert the selected data into a searchable format; receive a user selection of a portion of the selected data; apply heuristics to the portion; and recommend a field name and a field type based on the heuristics applied to the portion.

The system can be implemented in various ways to include one or more of the following features. For example, the one or more modules can perform operations including: receive user input initiating a query based on the recommended field name and field type; and provide a result of the query identifying a subset of the choices of data having the recommended field name and field type. The one or more modules can provide the result including: highlight a corresponding field value for the recommended field name in the subset of the choices of data. The one or more modules can provide the result including: provide the result as sortable on the field value. The one or more modules can provide the result including: display a visual indicator of the field name and the field value, wherein the visual indicator is separate and in addition to the highlight in the subset of the choices of data. The one or more modules can perform operations including: receive another user selection of another portion of the selected data; and apply heuristics to recommend a field name and a field type for the other portion of the selected data. The one or more modules can perform operations including: receive user input initiating a query based on the recommended field name and field type for the other portion; and provide a result of the query identifying a subset of the choices of data having the recommended field name and field type for the other portion. The one or more modules can provide the result including: highlight a corresponding field value for the recommended field name for the other portion in the subset of the choices of data. The one or more modules can provide the result including: provide the result for the other portion as sortable on the field value. The one or more modules can provide the result including: display a visual indicator of the field name and the field value for the other portion, wherein the visual indicator is separate and in addition to the highlight in the subset of the choices of data. The choices of data can include data associated with application performance management. The choices of data associated with application performance management can include log messages.

In another aspect, the disclosed technology can be implemented as a method. The method can be implemented in various ways to include one or more of the optional features described with respect to the system above.

In yet another aspect, the disclosed technology can be implemented using a non-transitory computer readable medium embodying instructions when executed by a processor to cause operations to be performed for recommending a field name. The non-transitory computer readable medium can be implemented in various ways to include one or more of the optional features as described with respect to the system disclosed above.

BRIEF DESCRIPTION OF THE DRAWINGS

Figure 1B:
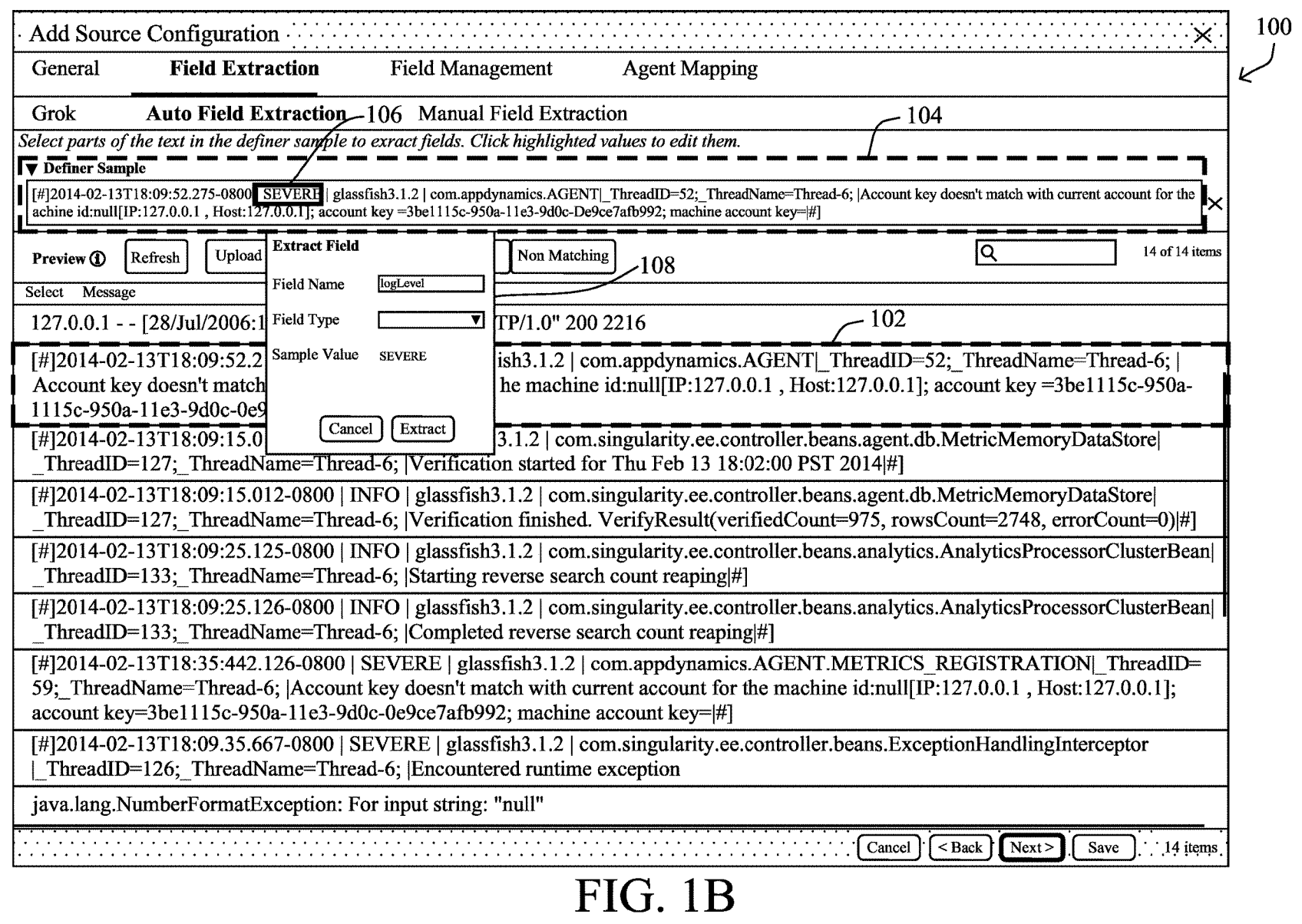
Figure 1C:
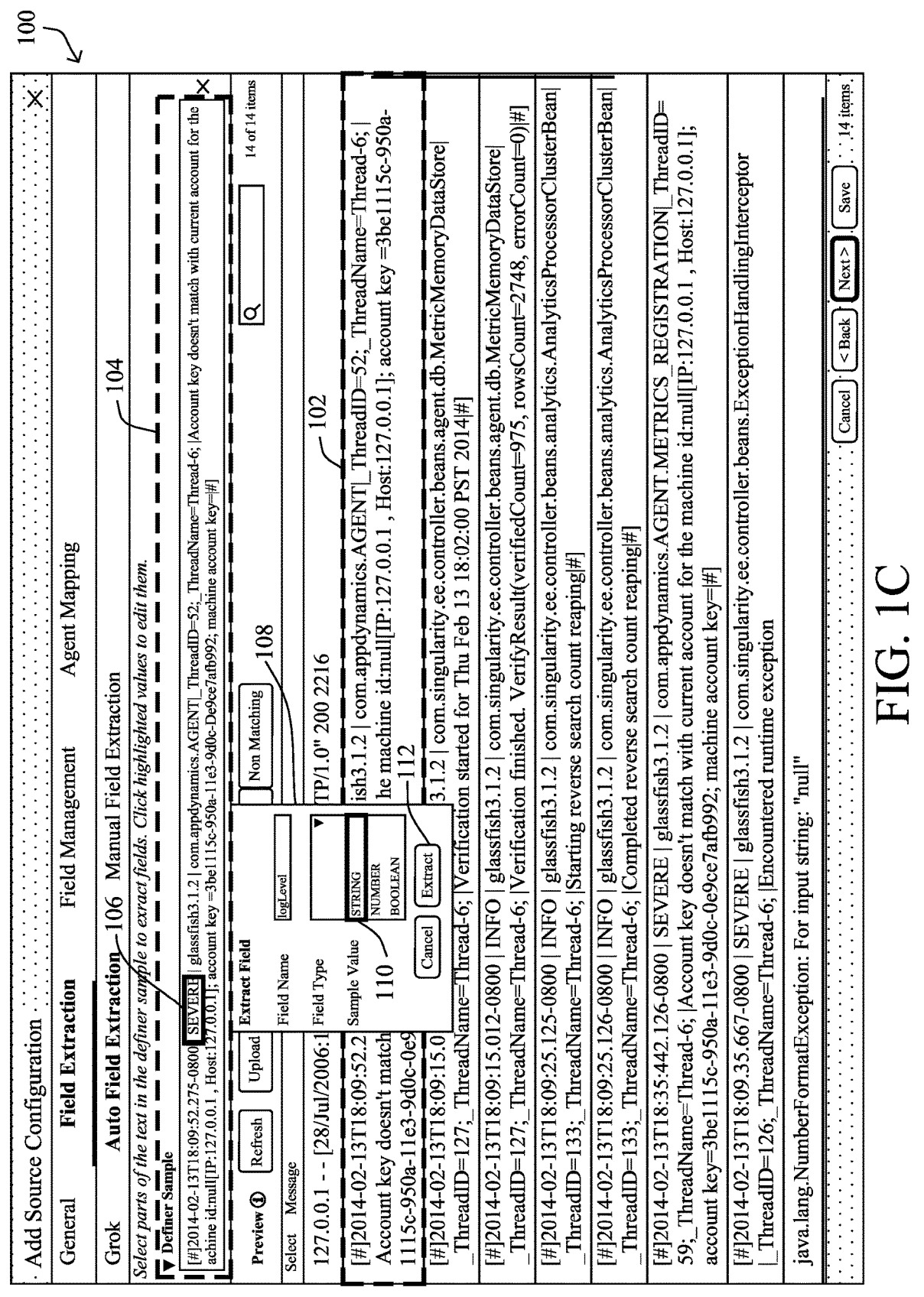
Figure 1D:
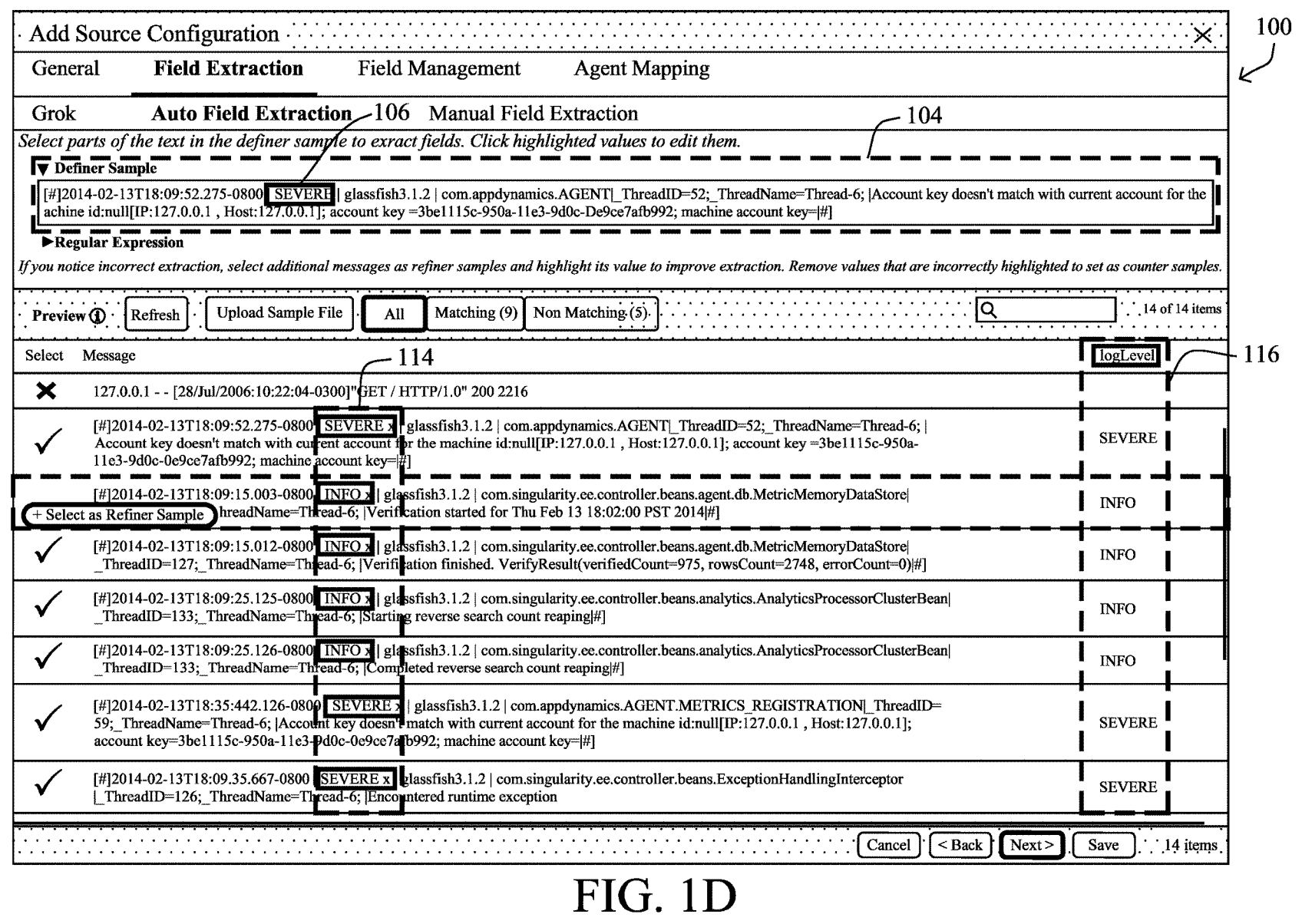
Figure 1E:
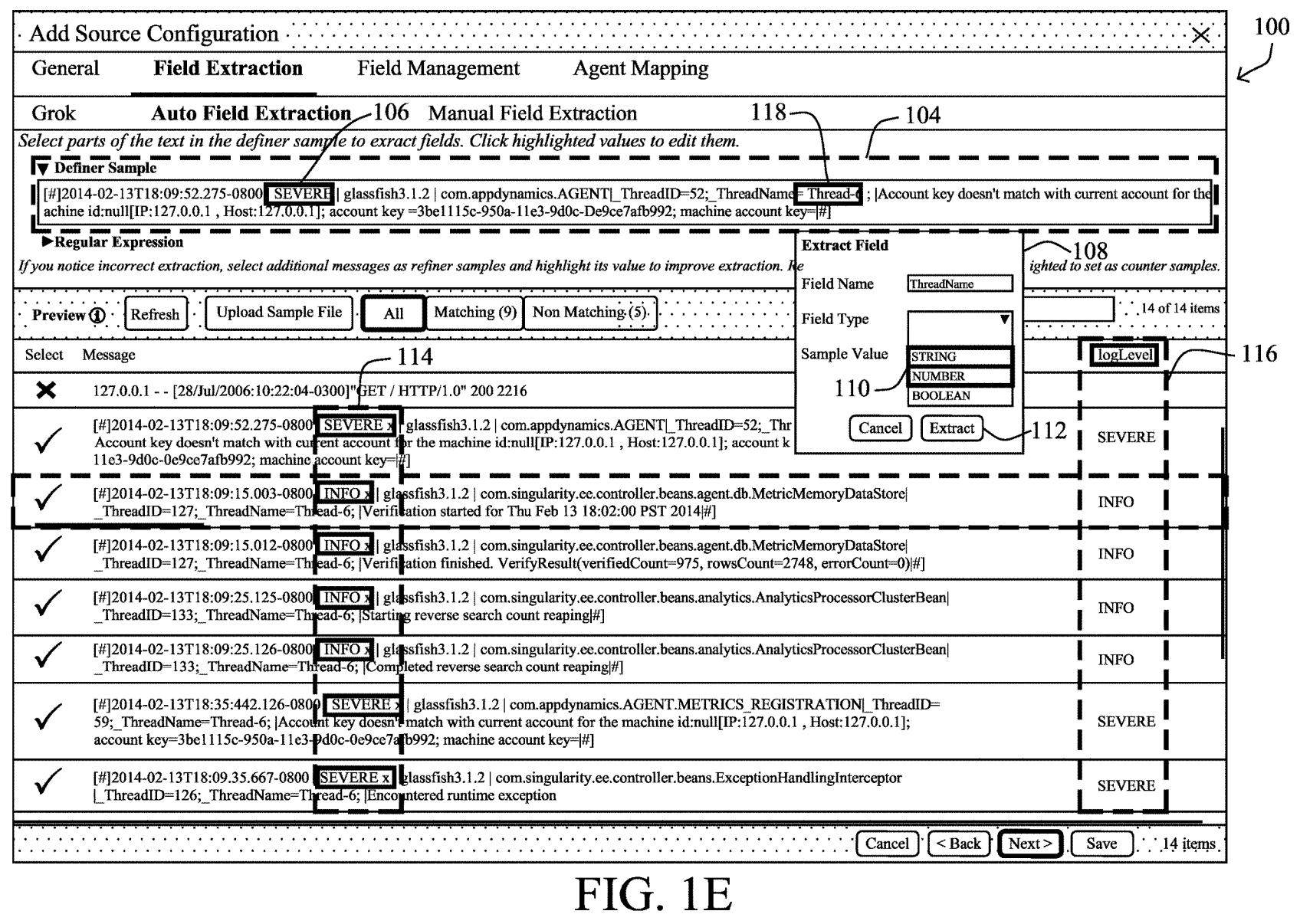

FIGS. 1A, 1B, 1C, 1D, 1E, 1F, and 1G are block diagrams illustrating exemplar user interfaces for performing field name recommendations.

FIG. 5 is a block diagram of an exemplary computing system implementing the disclosed technology.

DETAILED DESCRIPTION

Figure 1G:
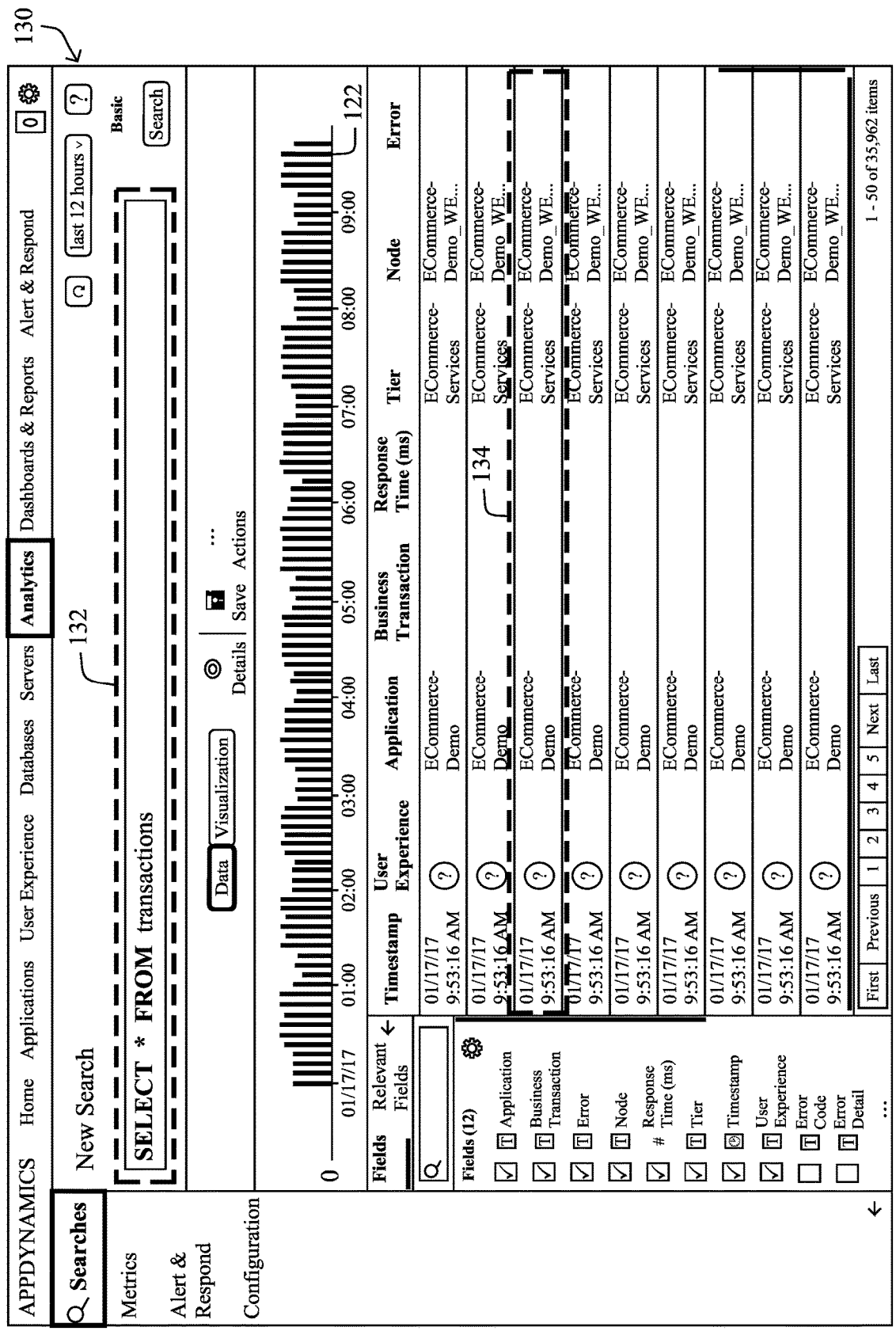

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. Efficiently managing the monitored data obtained from the monitoring is crucial for providing timely analysis of the monitored data. For example, when the monitored data are collected and managed in the cloud, such as in a Software as a Service (SaaS) environment, multiple accounts of monitored data must be efficiently managed while maintaining account level isolation.

Field Name Recommendations for Field Extraction Overview

The disclosed technology for field name recommendation can be used to enable a user to extract desired fields from an unstructured string of data, such as log messages or business transaction stack traces in an application performance management monitored data without having to type a query search, which often require strict database language format and syntax. Moreover, without the disclosed technology, the user is required to input everything, including field names in order to search and extract the field names. This can be difficult when the user is not familiar with all the different types of field names. The disclosed technology can be implemented as an intelligent predictive system that suggests the likely field name from a user selection of a portion of the string of data. The disclosed technology can be implemented to automatically suggests and provides field names to the user so the manual work from user side is reduced or minimized.

Exemplary Application: Log Analytics

FIG. 1A is a block diagram of an exemplary dashboard user interface 100 for performing the field name recommendation in a log message. In the user interface 100, rows of log events are displayed. One of the log even has been selected as indicated by reference identifier 102. Each log event can have different format and is unstructured—basically a simple string. For example, the selected first row of log event 102 is a string of field names and values including thread name, thread ID, log level (severe), IP address, host, account key, etc. Because of the unstructured nature of the simple string, performing analytics on the log events is difficult.

FIG. 1B is another block diagram of the exemplary dashboard user interface 100 for performing the field name recommendation in a log message. FIG. 1B shows the user interface 100 displaying an exemplary process of extracting different field values of the log event 102. In the example show in FIG. 1B, the selected log event 102 for analysis is put into a Definer Sample box 104. Highlighting any portion of the string causes the system to automatically identify the filed name, field type, and the field value of the highlighted value. For example, highlighting "SEVERE" 106 automatically identifies the field name for the selected portion 106 of the string as the field name: "logLevel" and the sample value of the logLevel field as the selected "SEVERE". Moreover, the field type can be auto recommended as a string. The extracted field information is displayed in a separate display area 108, such as a pop-up window.

FIG. 1C is yet another block diagram of the exemplary dashboard user interface 100 for performing the field name recommendation in a log message. In some implementations, the user can be provided the ability to select any of the field name, field type, and field value but provide a list of choices 110, for example by using a drop-down menu. Once the field name, field type and field value have been recommended, the user can initiate the search and extraction of all log messages with the selected field name by interfacing with a user input element, such as an "Extract" button 112.

FIG. 1D is yet another block diagram of the exemplary dashboard user interface 100 for performing the field name recommendation in a log message. Pressing the extract button initiates the extraction process to identify all log events with the logLevel field name and highlight the logLevel values 114. Also, a new column of data 116 is displayed along with the log event messages to isolate and indicate the field value for the field name extracted (e.g., logLevel) to provide an easy way to sort by the field value, for example, to have all SEVERE values on top.

FIG. 1E is yet another block diagram of the exemplary dashboard user interface 100 for performing the field name recommendation in a log message. Additional field names can be extracted by highlighting additional portions of the string. In the example shown in FIG. 1E, another extraction for the field name "ThreadName" is performed. Detecting the user selection (e.g., highlighting) another portion of the string 118 in the Definer Sample box 104 can trigger the display area 108, such as a pop-up window, to display the recommended field name, field name value, and field type. Again, any of the field name and field type can be manually selected by the user by providing a list of choices, such as using a drop-down menu. Pressing the extract button 112, initiates extraction of all log events with the field name that equals ThreadName and the corresponding field values for that field name.

FIG. 1F is yet another block diagram of the exemplary dashboard user interface 100 for performing the field name recommendation in a log message. Once the additional field name, ThreadName, has been extracted from the log messages, the values 120 of the ThreadName field name in each log message are highlighted or otherwise visually distinguished. Also, a second column 122 of field name filter is displayed next to the first field name, logLevel 116 to show the values of the ThreadName field name for each log message. Similar to the first field name, the logLevel, the ThreadName values can be sorted in any order or filtered for any specific value.

In some implementations, any of the extraction filters for a field name (e.g., logLevel, ThreadName) can be removed by pressing the delete button or any other similarly functioning user interface element.

Also, shown in FIG. 1F is a display of the regular expression 124 for a search query that can be used to manually entered to extract field names. The regular expression represents the manual way of entering a query request without any field name recommendation provided for by the disclosed technology. As described previously, it is difficult to use the regular expression due to the strict syntax requirement that makes it hard to read and write the regular expression.

Thus, the disclosed technology auto-identifies the field name for highlighted portion of the unformatted string to auto-recommend the field name to be analyzed and extracted.

Recommendation Engine

Automatically recommending the field name and field type as described with respect to FIGS. 1A-1F can be accomplished by a recommendation engine using two types of heuristics. One such heuristic is based on the context of the selected string. Responsive to receiving user selection of a portion of the string, the recommendation engine scans for characters before (i.e., left of) and/or characters after (i.e., to the right of) the selected portion of the string. For example, the field value Thread-6 118 in FIG. 1F is preceded by ThreadName= and followed by a semicolon. Thus, the identification of ThreadName= can be used to determine that the highlighted string is associated with a field name ThreadName. The context can be determined based on the structure of the characters that match know structures, such as JSON, XML, etc.

The second heuristic used by the recommendation engine is recommendation based on a pattern. For example, the field value SEVERE 106 in FIG. 1F is compared against known patterns. For example, the pattern for the values of field name logLevel is identified as a pattern of SEVERE, INFO, DEBUG, and WARNING. For an IP address, the recognized known pattern is a repeated series of numbers followed by a period followed by another number followed by a period followed by another number followed by a period followed by another number, such as 127.0.0.1. These patterns are saved in the recommendation system and the selected string is compared against the stored patterns. Other examples of recognizable pattern include time, date, URL, username, etc.

The system for recommending a field name can try the two heuristics to determine whether an inference can be made based on the context or the pattern detected. To improve the recommendation success rate, the stored context and patterns can be updated to improve the context and pattern recognition.

Additional Exemplary Applications

The disclosed technology can be applied to other data including stack traces of a business transaction (BT) to extract method name, class name, etc. FIG. 1G is a block diagram of the exemplary dashboard user interface 130 for performing the field name recommendation in stack traces of a BT. A description of a BT and associated technology is presented below with respect to FIGS. 3-5. A query for a transaction can be received through a user interface box 132. Rows of data related to the search query be displayed to show the application, tier, node, etc. associated with a BT. A user selection 134 of a row of BT data followed by a user selection of a portion of the data can trigger auto-recommendation of the method name, class name, etc. for extraction using heuristics described with respect to log messages.

Field Name Recommendation Method

Figures 2A, 2B:
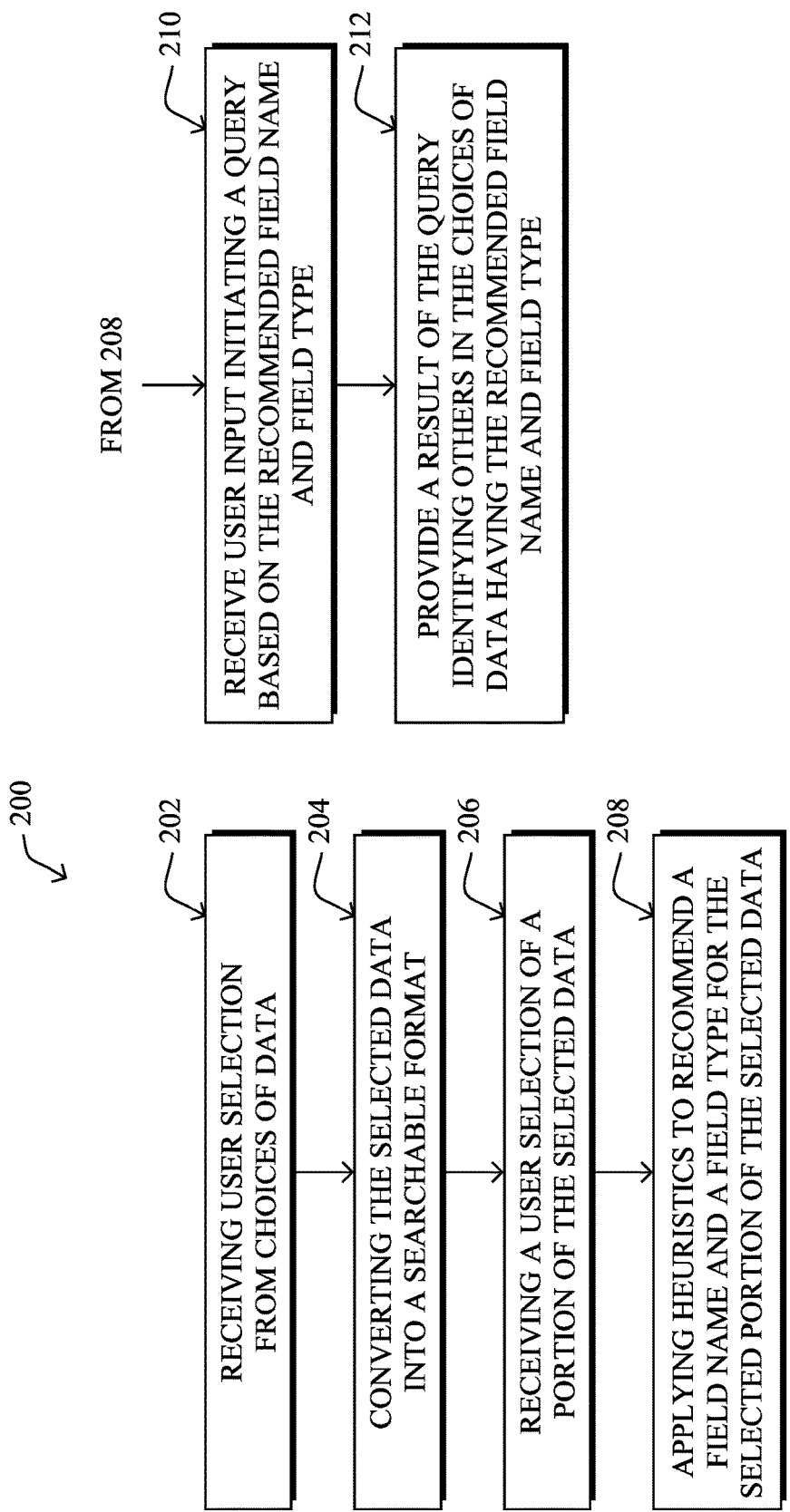
FIGS. 2A, 2B, 2C, 2D, 2E, and 2F are process flow diagrams of exemplar processes for performing field name recommendations.

FIGS. 2A, 2B, 2C, 2D, 2E, and 2F are process flow diagrams of an exemplary process 200, including various alternate and optional features, for performing field name recommendation. As shown in FIG. 2A, the process 200 includes receiving user selection from choices of data (202). For the examples illustrated in FIGS. 1A-1F, choices of log messages are displayed and a user selection of one of the displayed log messages is received. The received user selection of the data is converted into a searchable format (204). For the example illustrated in FIGS. 1A-1F, the selected log message is displayed in the Definer Sample window that parses out the different portions of the log message, which is represented as a string, ready to be selected by the user. A user selection of a portion of the selected data is received (206). For the example illustrated in FIGS. 1A-1F, the selected portion can be a value of a field name. Responsive to receiving the user selection of the portion, heuristics are applied to automatically recommend a field name and a field type (208). In addition, a sample value, for example when the selected portion is the field value, is displayed. The recommendation of the field name and field type can be displayed using a pop-up menu screen, for example.

As shown in FIG. 2B, responsive to receiving a user input initiating a query based on the recommended field name and field type (210), a result of the query is provided (212). The result identifies others in the choices of data having the recommended field name and field type. For the example illustrated in FIGS. 1A-1F, other log messages having the user selected field name and field type are identified and displayed.

Figures 2C, 2D:
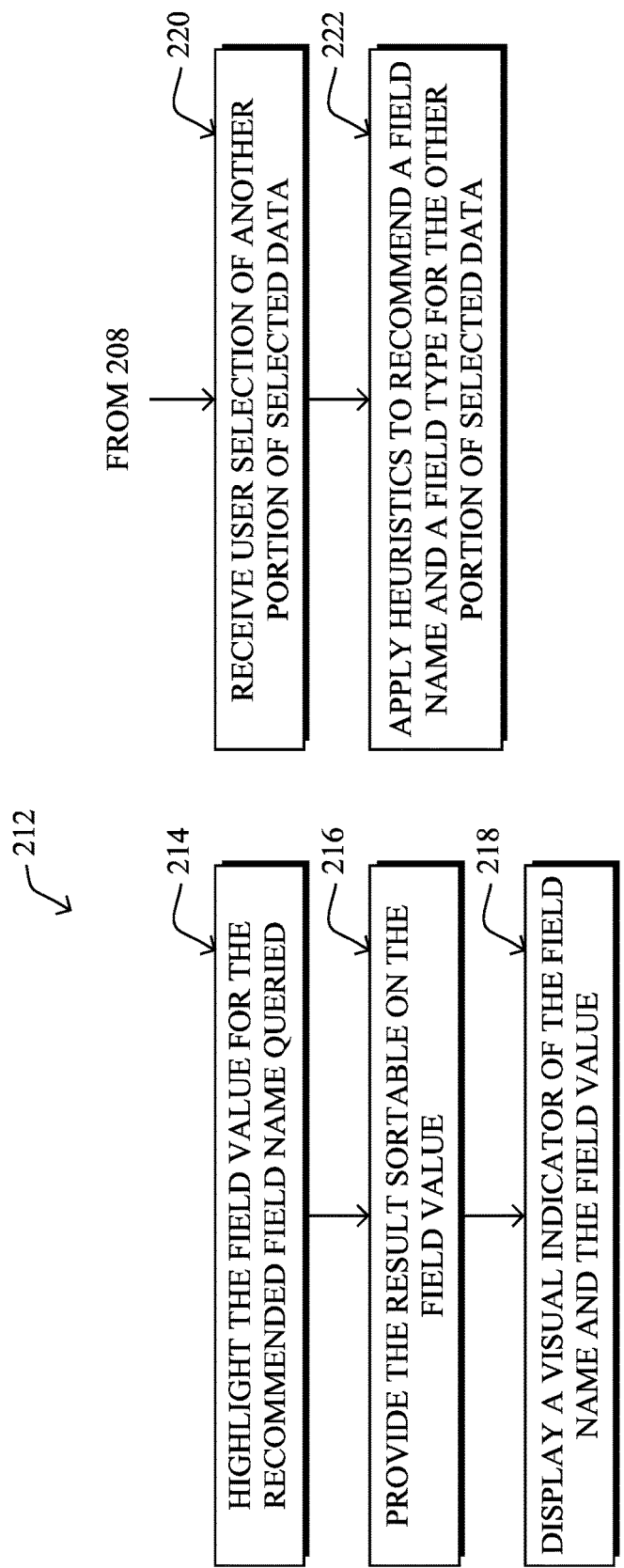

As shown in FIG. 2C, providing the result can include highlighting the field value for the recommended field name queried (214). For the example illustrated in FIGS. 1A-1F, all log messages having the recommended field name are displayed with the corresponding field value highlighted. In addition, the result can be provided sortable on the field value of the field name (216). For the example illustrated in FIGS. 1A-1F, the log messages having the recommended field name can be sorted based on the value of the field name, such as logLevel field name. Moreover, a visual indicator of the field name and the field value can be displayed along with the log messages to isolate the field name and field value associated with each log message (218). In the example illustrated in FIGS. 1A-1F, a column can be displayed with a column name that represents the field name recommended (e.g., logLevel) and the corresponding field value for that field name for each log message having the field name, logLevel.

In some implementations, additional queries can be performed for additional field names as shown in FIG. 2D. Specifically, a user selection of another portion of the selected data can be received (220). Responsive to the received user selection of the other portion, a field name and a field type for the other portion can be recommended by applying heuristics (222) similar to the process 208 in FIG. 2A. In the example shown in FIGS. 1A-1F, a user selection of another portion of the string, such as "Thread-6" can be received and a field name and a field type for the user selected "Thread-6" can be recommended by applying heuristics. Different heuristics as disclosed in this patent document can be applied, including context and pattern recognition.

Figures 2E, 2F:
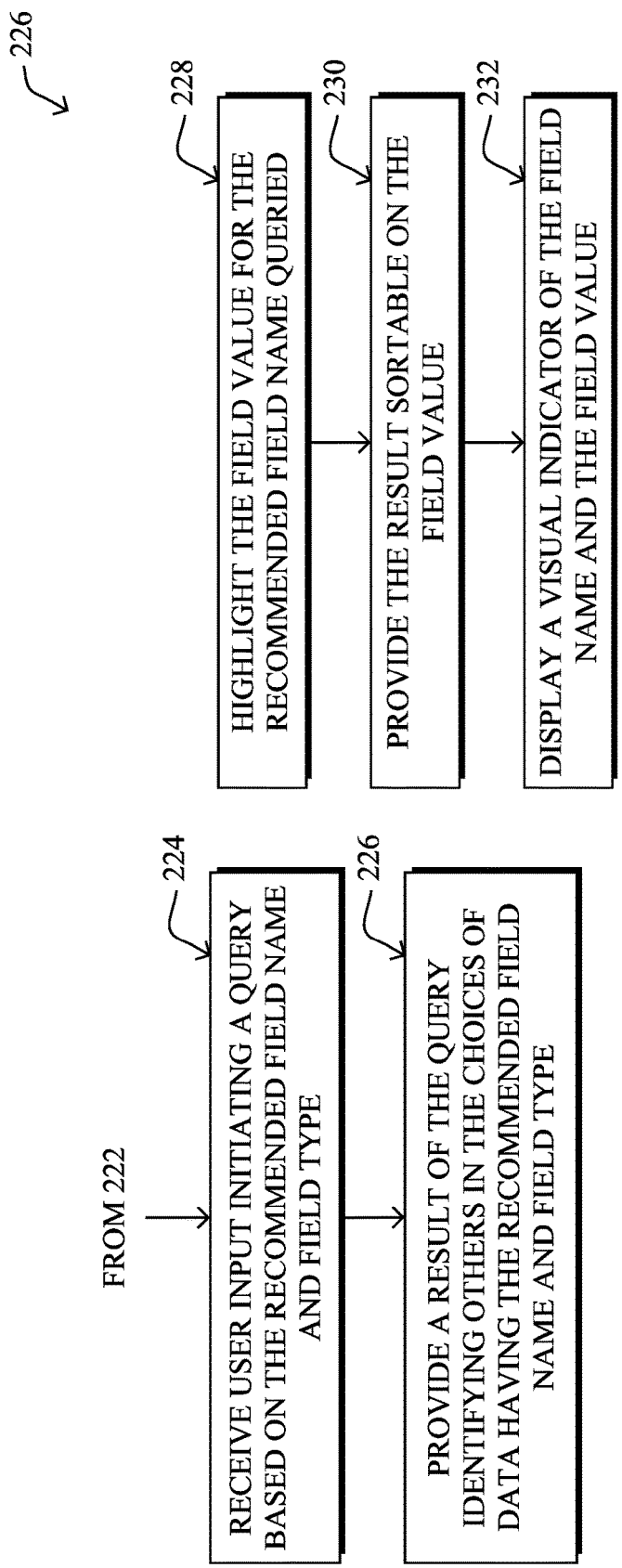

As shown in FIG. 2E, user input initiation a query based on the recommended field name and field type for the other portion can be received (224). Responsive to the initiated query, a result of the query identifying others in the choices of data having the recommended field name and field type can be provided (226). For the example illustrated in FIGS. 1A-1F, a user selection of the Extract button can be determined as the initiation of another query for the user selected "Thread-6" portion of the string.

As shown in FIG. 2F, providing the result of the query for the other portion can include highlighting the field value for the recommended field name queried (228). The provided result can be sortable on the field value (230). In addition, a visual indicator of the field name and field value can be displayed along with the log messages to isolate the field name and field value associated with each log message (232). In the example illustrated in FIGS. 1A-1F, the log messages having the recommended field name (e.g., Thread-Name) can be sorted based on the value of the field name. As for the visual indication, a column can be displayed with a column name that represents the field name recommended (e.g., ThreadName) and the corresponding field value for that field name for each log message having the field name, ThreadName.

As illustrated in FIGS. 1A-1F, multiple field names can be extracted responsive to receiving user selection of multiple portions of the selected data, such as the log message. Each user selection can trigger the automatic recommendation of a field name and a field type. In some implementations, any added filter for the selected portion of the data can be deleted to remove the extraction function for any given field name.

Application Intelligence Platform Architecture

The disclosed technology for field name recommendations for field extraction can be applied to enhance the performance of an application intelligence platform for application performance management. Many of the advantages of the disclosed technology including the ability to automatically recommend a field name and a field type can improve the performance of the application intelligence platform for application performance management by enabling the user to extract field names easily without having to enter a regular expression. In one aspect, as discussed with respect to FIGS. 3-5 below, performance issues with a monitored environment is detected by monitoring applications and entities, such as transactions, tiers, nodes, and machines in the monitored environment using agents installed at individual machines at the entities. For example, each node can include one or more machines that perform part of the applications. The agents collect data associated with the applications of interest and associated nodes and machines where the applications are being operated. Examples of the collected data include performance data, such as metrics, metadata, and topology data that indicate relationship information. The agent collected data are provided to one or more controllers to analyze the data. The disclosed technology for automatically recommending field names can be applied to process log messages and business transaction associated stack traces to improve analysis of performance issues with the monitored environment.

Figure 3:
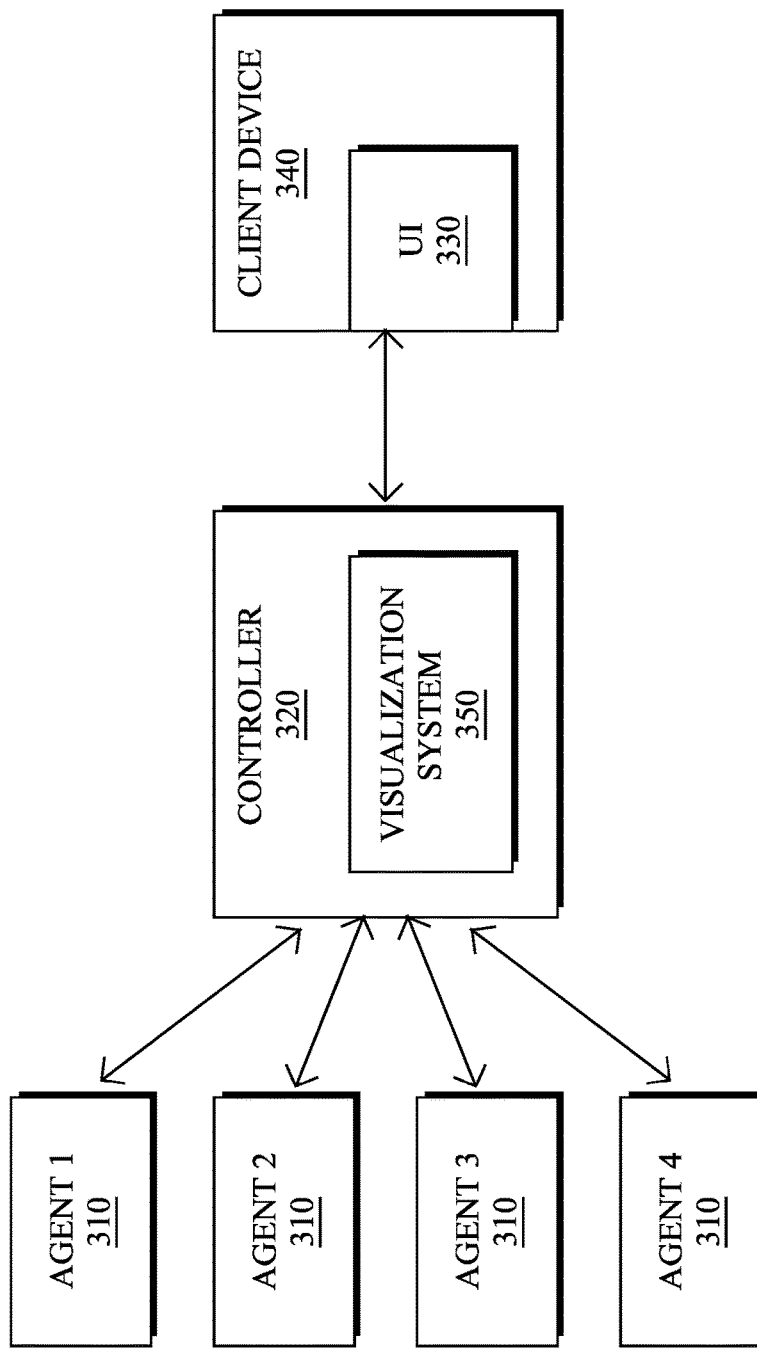
FIG. 3 is a block diagram of an exemplary application intelligence platform that can implement the field name recommendations as disclosed in this patent document, including the processes disclosed with respect to FIGS. 1A-1G.

FIG. 3 is a block diagram of an exemplary application intelligence platform 300 that can implement the field name recommendations for field extraction as disclosed in this patent document. The application intelligence platform is a system that monitors and collect metrics of performance data for an application environment being monitored. At the simplest structure, the application intelligence platform includes one or more agents 310, 312, 314, 316 and one or more controllers 320. While FIG. 3 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions distributed over application servers. Specifically, the controller 320 can receive runtime data from agents 310, 312, 314, 316 and coordinators, associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data.

In the Software as a Service (SaaS) implementation, a controller instance 320 is hosted remotely by a provider of the application intelligence platform 300. In the on-premise (On-Prem) implementation, a controller instance 320 is installed locally and self-administered.

The controllers 320 receive data from different agents 310, 312, 314, 316 deployed to monitor applications, databases and database servers, servers, and end user clients for the monitored environment. Any of the agents 310, 312, 314, 316 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 310, 312, 314, 316) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 320 can include a visualization system 350 for displaying the reports and dashboards related to the disclosed technology. In some implementations, the visualization system 350 can be implemented in a separate machine (e.g., a server) different from the one hosting the controller 320.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in tier Snapshots usually include call graphs that allow that enables drilling down to the line of code that may be causing performance problems. The most common snapshots are transaction snapshots.

Exemplary Implementation of Application Intelligence Platform

Figure 4:
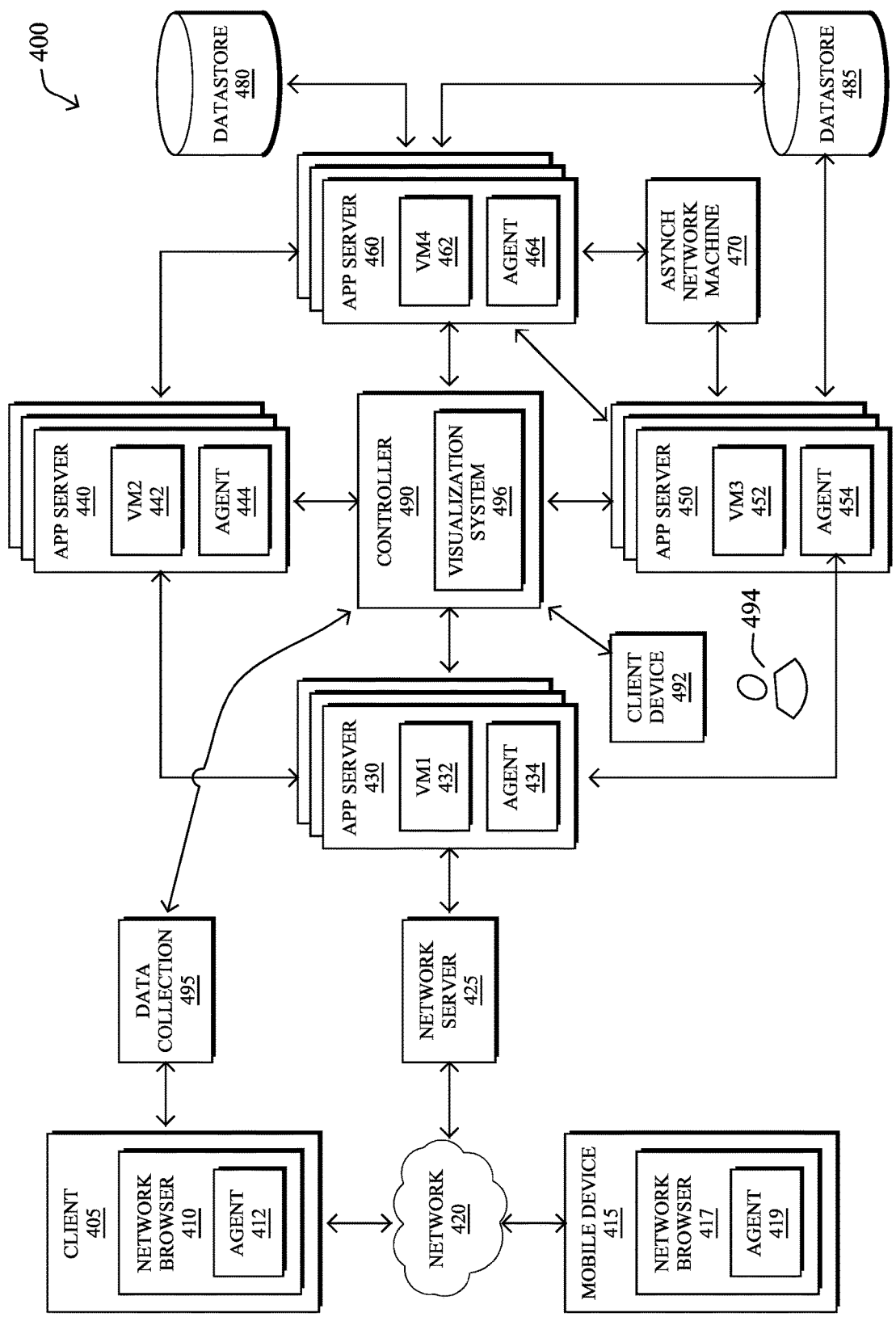
FIG. 4 is a block diagram of an exemplary system for field name recommendations as disclosed in this patent document, including the processes disclosed with respect to FIGS. 1A-1G and 2A-2F.

FIG. 4 is a block diagram of an exemplary system 400 for performing field name recommendations for field extraction as disclosed in this patent document, including the processes disclosed with respect to FIGS. 1A, 1B, 1C, 1D, 1E, 1F, 2A, 2B, 2C, 2D, 2E, and 2F. The system 400 in FIG. 4 includes client device 405 and 492, mobile device 415, network 420, network server 425, application servers 430, 440, 450 and 460, asynchronous network machine 470, data stores 480 and 485, controller 490, and data collection server 495. The controller 490 can include visualization system 496 for providing displaying of the report generated for performing the field name recommendations for field extraction as disclosed in this patent document. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e. "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454 and 464 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450 and 460 may include an application and agents. Each application may run on the corresponding application server. Each of applications 442, 452 and 462 on application servers 440-460 may operate similarly to application 432 and perform at least a portion of a distributed business transaction. Agents 444, 454 and 464 may monitor applications 442-462, collect and process data at runtime, and communicate with controller 490. The applications 432, 442, 452 and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444 and 454. Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452 and 462 may be any of several types of applications. Examples of applications that may implement applications 432-462 include a Java, PHP, .Net, Node.JS, and other applications.

FIG. 5 is a block diagram of a computer system 500 for implementing the present technology. System 500 of FIG. 4 may be implemented in the contexts of the likes of clients 505, 592, network server 525, servers 530, 540, 550, 560, a synchronous network machine 570 and controller 590.

The computing system 500 of FIG. 4 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for recommending a field name in data, the system including:
   a hardware processor;
   a memory; and
   one or more modules stored in the memory and executable by a processor to perform operations including:
      receive a user selection of one or more log messages from a plurality of log messages indicative of a monitored business transaction, wherein the plurality of log messages are selectable by the user on a user interface as individual strings;
      convert the one or more log messages into a searchable format by parsing the one or more log messages into selectable portions of one or more strings associated with the one or more log messages;
      receive a user selection of a selectable portion of the one or more log messages, wherein the selectable portion includes an indication of a value of a field name;
      apply one or more heuristics to the selectable portion to determine a context or pattern of the value of the field name associated with the selectable portion;
      automatically recommend, using the determined context or pattern of the value of the field name associated with the selectable portion, the field name and a field type of the field name for an unstructured string of data without having a query search;
      providing a result of the recommendation as sortable based on the field value, wherein the result identifies a subset of choices of data having the recommended field name and the field type of the field name, and wherein a corresponding field value for the recommended field name is highlighted in the subset of the choices of data.

2. The system of claim 1, wherein the choices of data include data associated with application performance management.

3. The system of claim 2, wherein the choices of data associated with application performance management include log messages.

4. A method for recommending a field name, the method including:
   receiving, by a computing device comprising a hardware processor, a user selection of one or more log messages from a plurality of log messages indicative of a monitored business transaction, wherein the plurality of log messages are selectable by the user on a user interface as individual strings;
   converting the one or more log messages into a searchable format by parsing the one or more log messages into selectable portions of one or more strings associated with the one or more log messages;
   receiving a user selection of a selectable portion of the one or more log messages, wherein the selectable portion includes an indication of a value of a field name;
   applying one or more heuristics to the selectable portion to determine a context or pattern of the value of the field name associated with the selectable portion;
   automatically recommending, using the determined context or pattern of the value of the field name associated with the selectable portion, the field name and a field type of the field name for an unstructured string of data without having a query search;
   providing a result of the recommendation as sortable based on the field value, wherein the result identifies a subset of choices of data having the recommended field name and the field type of the field name, and wherein a corresponding field value for the recommended field name is highlighted in the subset of the choices of data.

5. The method of claim 4, wherein the choices of data include data associated with application performance management.

6. The method of claim 5, wherein the choices of data associated with application performance management include log messages.

7. A non-transitory computer readable medium embodying instructions when executed by a hardware processor to cause operations to be performed for recommending a field name, the operations including:
   receiving a user selection of one or more log messages from a plurality of log messages indicative of a monitored business transaction, wherein the plurality of log messages are selectable by the user on a user interface as individual strings;
   converting the one or more log messages data into a searchable format by parsing the one or more log messages into selectable portions of one or more strings associated with the one or more log messages;
   receiving a user selection of a selectable portion of the one or more log messages, wherein the selectable portion includes an indication of a value of a field name;
   applying one or more heuristics to the selectable portion to determine a context or pattern of the value of the field name associated with the selectable portion;
   automatically recommending, using the determined context or pattern of the value of the field name associated with the selectable portion, the field name and a field type of the field name for an unstructured string of data without having a query search;

providing a result of the recommendation as sortable based on the field value, wherein the result identifies a subset of choices of data having the recommended field name and the field type of the field name, and wherein a corresponding field value for the recommended field name is highlighted in the subset of the choices of data.

\* \* \* \* \*

UNITED STATES PATENT AND TRADEMARK OFFICE
CERTIFICATE OF CORRECTION

PATENT NO. : 10,706,108 B2
APPLICATION NO. : 15/582661
DATED : July 7, 2020
INVENTOR(S) : Yuchen Zhao Page 1 of 1

It is certified that error appears in the above-identified patent and that said Letters Patent is hereby corrected as shown below:

In the Specification

Column 9, Line 20, please amend as shown:
A business transaction representation of the particular ser- Signed and Sealed this
Third Day of November, 2020

Andrei Iancu
*Director of the United States Patent and Trademark Office*